United States Patent [19]

Rohrbacher

[11] Patent Number: 4,902,557
[45] Date of Patent: Feb. 20, 1990

[54] THERMOPLASTIC POLYOLEFIN COMPOSITE STRUCTURE

[75] Inventor: Frank Rohrbacher, Wilmington, Del.

[73] Assignee: E. I. Du Pont de Nemours and Company, Wilmington, Del.

[21] Appl. No.: 147,971

[22] Filed: Jan. 25, 1988

[51] Int. Cl.⁴ .................. B32B 27/08; C08J 7/04; B28B 9/00

[52] U.S. Cl. .................... 428/215; 428/31; 428/516; 428/520; 264/176.1; 264/241; 264/513

[58] Field of Search ............... 428/516, 520, 215, 216, 428/31

[56] References Cited

U.S. PATENT DOCUMENTS

| | | | |
|---|---|---|---|
| 3,419,458 | 12/1968 | Brooks et al. | 428/31 X |
| 3,579,485 | 5/1971 | Folzenlogen | 260/78.4 D |
| 4,303,697 | 12/1981 | Baseden | 427/54.1 |
| 4,579,781 | 4/1986 | Akao | 428/516 |
| 4,643,789 | 2/1987 | Parker et al. | 156/219 |
| 4,650,533 | 3/1987 | Parker et al. | 156/219 |
| 4,737,548 | 4/1988 | Kojima et al. | 428/516 |

FOREIGN PATENT DOCUMENTS

| | | |
|---|---|---|
| 143321 | 6/1985 | European Pat. Off. . |
| 3417729 | 11/1985 | Fed. Rep. of Germany . |
| 59-135231 | 3/1972 | Japan . |
| 54-114586 | 9/1979 | Japan . |
| 58-040324 | 3/1983 | Japan . |
| 61-029539 | 2/1986 | Japan . |
| 61-104842 | 5/1986 | Japan . |
| 61-205118 | 9/1986 | Japan . |
| 61-252158 | 11/1986 | Japan . |
| 62-041202 | 2/1987 | Japan . |
| 62-061679 | 3/1987 | Japan . |
| 62-062830 | 3/1987 | Japan . |
| 2157699 | 7/1987 | United Kingdom . |

OTHER PUBLICATIONS

Sales specification sheet, Eastman Chemical Products, Inc., Chlorinated Polyolefins, Oct., 1984.
Translation, Japaneiepatent 554-114586, Sep. 6, 1979.
Translation, Japanese Patent 554-40324, Mar. 9, 1983.
Publication No. GN-355, Chlorinated Polyolefin CP-343-1 (100%) Nov., 1983.
Publication 840217, Olefin Thermoplastic Elastomer a New Choice for Bumper Systems, Nowak et al., Republic Plastics Company.

Primary Examiner—P. C. Ives
Attorney, Agent, or Firm—Hilmar L. Fricke

[57] ABSTRACT

A thermoplastic polyolefin composite that is useful as an exterior auto or truck body part has the following layers of components:

a. a layer of a glossy clear thermoplastic finish bonded firmly to b. a layer of a thermoplastic pigment containing paint firmly bonded to c. a thin size layer of a thermoplastic chlorinated polyolefin that is firmly bonded to d. a flexible sheet of a thermoplastic polyolefin resin.

A thermoformable composite sheet structure that can be made into the above laminate having the layers a.-d. of the above structure also is part of this invention.

25 Claims, 3 Drawing Sheets

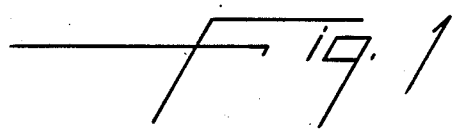
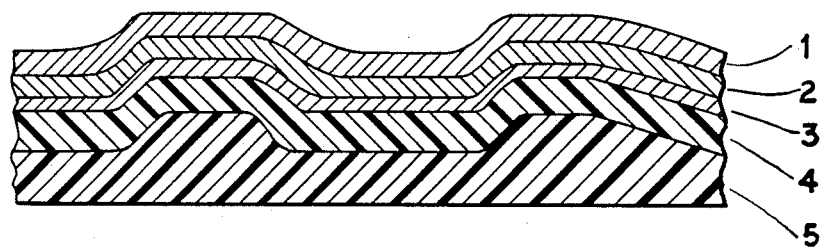
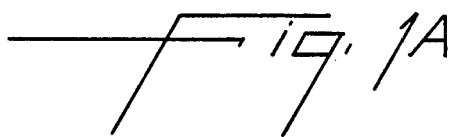
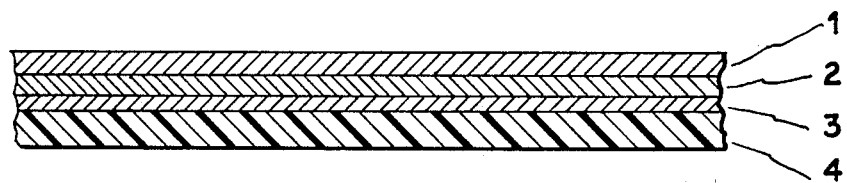

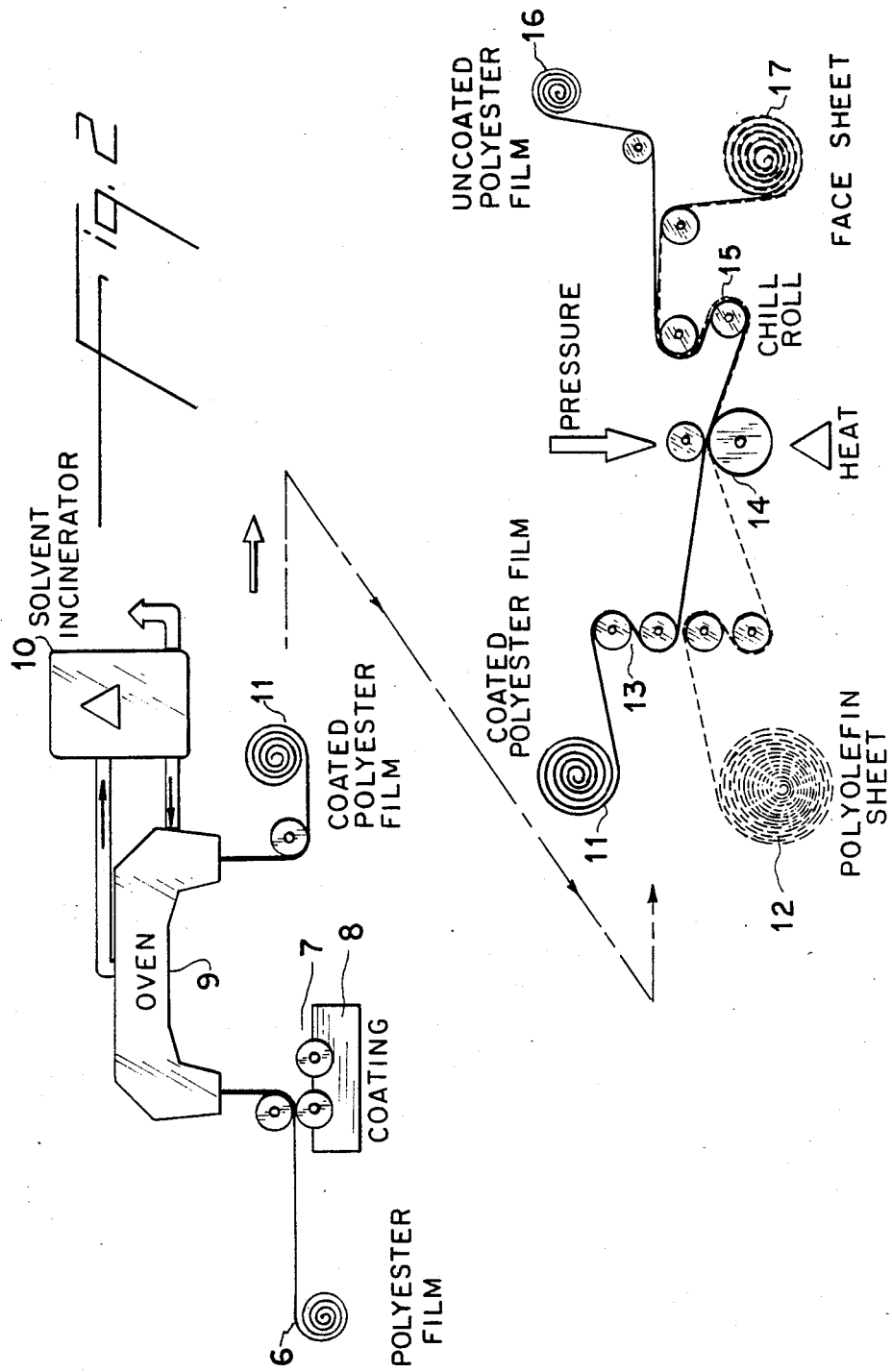

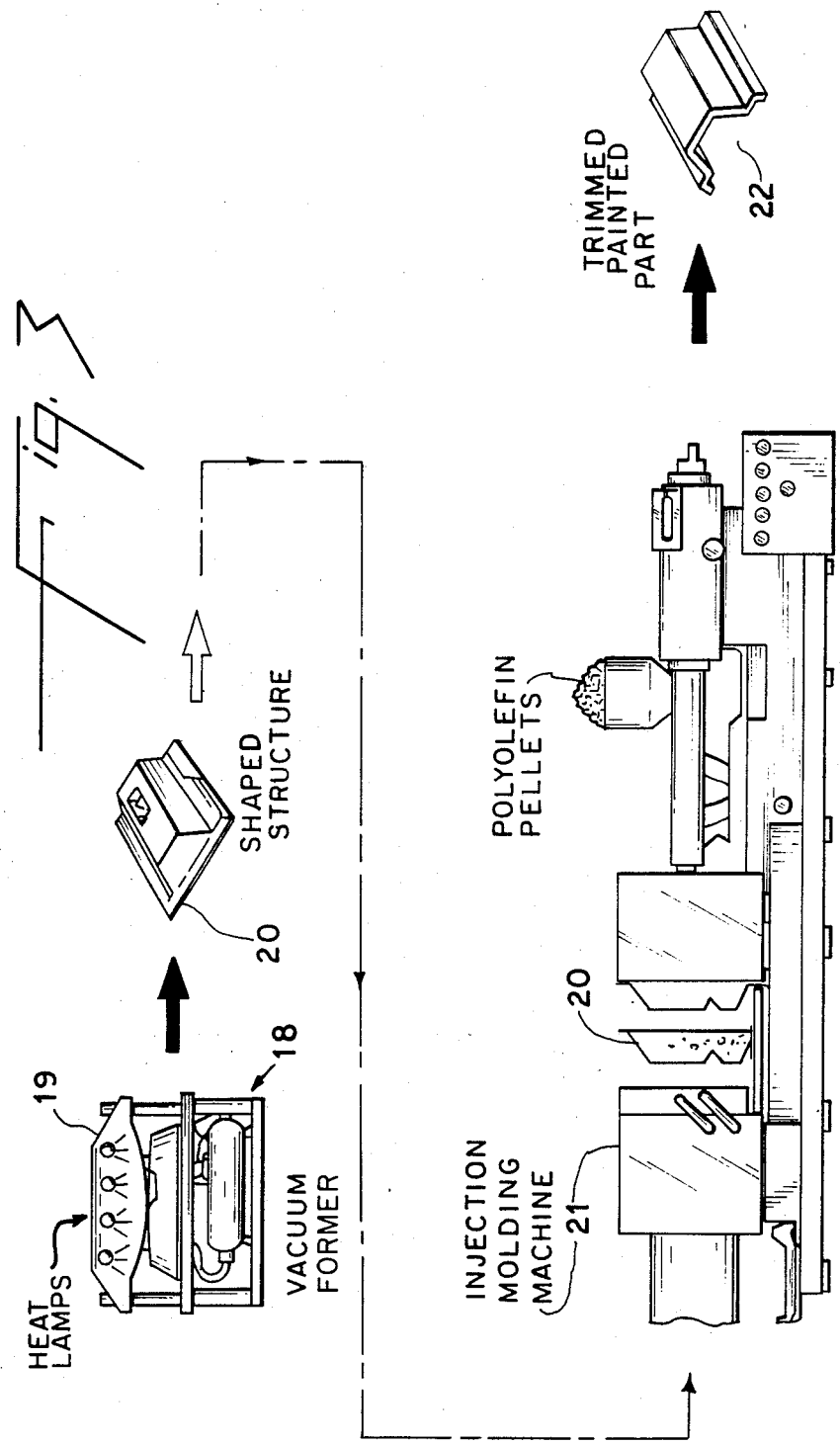

THERMOPLASTIC POLYOLEFIN COMPOSITE STRUCTURE

BACKGROUND OF THE INVENTION

This invention is related to composite structures and in particular to composite structures of thermoplastic polyolefins.

Exterior auto and truck parts such as bumpers, fender extensions, wheel covers, hub caps, trim rings for wheels, lamp housings, grills, other facia components and other molded exterior parts of thermoplastic polyolefins (TPOs) such as polypropylene polyethylene are currently being used because of their resistance to permanent deformation on impact and their corrosion resistance. These parts replace metals which are easily dented and subject to corrosion and rapid deterioration by weathering. TPOs are easily and economically injection molded into auto and truck parts that are substantially lighter than currently used sheet metal parts thereby favorably affecting the weight and fuel economy of the auto or truck. Another advantage of TPOs is that more intricate designs can be made in comparison to sheet metals giving the auto makers increased freedom in design of autos.

Though less expensive then other conventional plastics used for automotive parts, TPOs have made only a limited penetration into the enormous automotive facia and vertical autobody panel market. The most critical problem perceived by the automobile manufacturers about the use of TPOs on automobiles and trucks is the difficulties encountered in painting them. TPOs have an extremely low surface energy and most conventional automotive paints do not wet the TPO's surface or adhere to the TPO. A number of techniques have been used to modify the surface of the TPO or special sealers have been used to overcome these problems but none have been completely successful.

The most common method employed to overcome the adhesion problem is to seal the TPO injection molded part with about a 5-10 micron thick layer of a sealer containing chlorinated carboxylated polyalphaolefin such as a chlorinated maleated polypropylene as shown in Folzenlogen et al U.S. Pat. No. 3,579,485 issued May 18, 1971. Another is shown in Baseden U.S. Pat. No. 4,303,697 issued Dec. 1, 1981 in which a polyolefin substrate such as polypropylene is primed with a chlorinated polypropylene containing carboxylic anhydride groups and then exposing the primer to ultraviolet radiation which improves both dry and wet adhesion of subsequently applied paints. Other techniques have been used to change the surface chemistry of the TPO substrate such as the use of plasma and arc treatments.

However, coating or treating complex shapes that contain recesses is extremely difficult in practice on the scale required for automotive production using the above methods and techniques and numerous cases of finish delamination from the TPO substrate after use on automobiles and trucks in the field have been experienced.

Another problem encountered with the painting of TPO parts is the need for a primer coat between the sealer coat or the treated TPO substrate and the topcoat finish or paint. Primers applied over metal substrates have functional uses such as providing corrosion resistance and providing a smooth surface. When primers are applied over TPO substrates, they are applied only to provide a smooth or class A surface to which the paint or topcoat finish is applied. A smooth surface on TPOs can be produced by polishing the injection mold in which they are formed. However, on removal of the injection molded part from the polished mold, the surface of the part can be damaged which then requires the use of a primer to provide a smooth surface.

Still another problem encountered with painting TPO parts, is the need for special jigs or hangers to maintain the shape of the part during the baking of the primer and the topcoat. These special hangers or jigs for each part represent a major capital expenditure and add cost and complexity to the finishing process.

To reduce air pollution, automobile and truck manufactures need to reduce the amount of painting in the manufacturing process and do not want to add additional painting steps to the process to coat TPO parts. It would be desirable to have a TPO auto or truck part that has a high quality durable and weatherable surface whose color matches the painted sheet metal used to make the auto or truck and that can attached directly in the assembly process and does not require further priming or painting. This would eliminate the costly and time consuming painting process for TPOs with the associated pollution problems.

SUMMARY OF THE INVENTION

A thermoplastic polyolefin (TPO) composite that is useful as an exterior auto or truck body part has the following layers of components:
a. a layer of a glossy clear thermoplastic finish that is firmly bonded to
b. a layer of a thermoplastic pigment containing paint that is firmly bonded to
c. a thin size layer of a thermoplastic chlorinated polyolefin that is firmly bonded to
d. a flexible sheet of a thermoplastic polyolefin that is bonded to
e. a thick rigid layer of a thermoplastic polyolefin resin.

A thermoformable composite sheet structure that can be made into the above composite having the following layers also is part of this invention:
a. a layer of a glossy clear thermoplastic finish that is firmly bonded to
b. a layer of a thermoplastic paint containing pigment that is firmly bonded to
c. a thin size layer of a thermoplastic chlorinated polyolefin that is firmly bonded to
d. a flexible sheet of a thermoplastic polyolefin.

BRIEF DESCRIPTION OF THE DRAWINGS

FIG. 1 shows a cross section of the composite.

FIG. 1A shows a cross section of the thermoformable composite sheet structure or face sheet.

FIG. 2 shows roller coating of paint onto a polyester film and the formation of the thermoformable composite sheet structure or face sheet.

FIG. 3 shows the process for making the composite from the face sheet.

DETAILED DESCRIPTION OF THE INVENTION

A cross section of the composite is shown in FIG. 1. Layer 1 which is the exterior layer of the composite is a cured thermoplastic lacquer clear coating that has an glossy finish of automotive quality and must have excellent weatherability, scratch and mar resistance and good gloss retention on weathering. Layer 1 is firmly adhered to paint layer 2 which is a pigmented thermoplastic lacquer of automotive quality that must withstand weathering and not crack and fade. The combination of layers 1 and 2 must provide the laminate with an automotive quality finish that has excellent gloss, high distinctness of image, gasoline resistance, abrasion and mar resistance, acid resistance and excellent weatherability including good gloss retention.

Layer 3 is a thin layer of a thermoplastic chlorinated polyolefin that provides intercoat adhesion of the pigmented thermoplastic layer 2 to layer 4 which is a thermoplastic polyolefin extruded sheet. Layer 5 is a relatively thick rigid thermoplastic injection molded polyolefin resin layer to which layer 4 is firmly adhered.

Preferably, the thermoformed composite laminate has the following thicknesses for each layer of the laminate:

1. a 15-125 micron thick layer of the glossy clear thermoplastic finish that is bonded firmly to
2. a 10-75 micron thick layer of the thermoplastic pigment containing paint that is firmly bonded to
3. a 1-20 micron thick layer of a thermoplastic chlorinated polyolefin that is firmly bonded to
4. a 250-1250 micron thick layer of a flexible sheet of a thermoplastic polyolefin that is bonded to
5. a 500-25,000 micron thick rigid layer of a thermoplastic polyolefin resin.

In the formation of the composite, a thermoformable composite sheet structure or face sheet is first formed. FIG. 1A shows a cross section of the face sheet. The face sheet is composed of layers 1-4 of the composite before being thermoformed.

The face sheet preferably has the following thickness for each of the layers used:

1. a 15-125 micron thick layer of the glossy clear thermoplastic finish that is bonded firmly to
2. a 10-75 micron thick layer of the thermoplastic pigment containing paint that is firmly bonded to
3. a 1-20 micron thick layer of a thermoplastic chlorinated polyolefin that is firmly bonded to
4. a 250-1250 micron thick layer of a flexible sheet of thermoplastic polyolefin.

FIG. 2 shows a process for making the face sheet. A polyester film 6, typically a "Mylar" 200A polyethylene terephthalate film about 50 microns thick, is fed through a 3 roll roller coater 7 containing a clear coating composition 8 and by reverse roller coating about a 15-125 micron thick coating (dry basis) is applied. Coating line speeds of about 5-25 meters/minute are used. The coated film is then passed through the oven 9, preferably having multiple heating zones; typically three heating zones are used. The first zone is at about 120° C. and the last zone is at about 200° C. A solvent incinerator is used to incinerate solvent fumes from the coating composition. The coated film is then wound into roll 11. The roller coater 7 is filled with a pigmented coating coating composition instead of the clear composition and the process is repeated to apply about 10-75 micron thick coating (dry basis) of the pigmented coating or color coat over the clear coat layer on the film to form a polyester film having a clear coat layer and a color coat layer. The coated polyester film 11 is then coated using the same process with a 1-25 micron thick layer (dry basis) of a chlorinated polyolefin thermoplastic.

The resulting coated polyester film is then laminated to a thermoplastic polyolefin sheet about 250-1250 microns in thickness. The roll of coated polyester film 11 and a roll of the polyolefin sheet are fed at a line speed of about 5-20 meters/minute through guide rollers 13 and then through two heated nip rollers 14 at a temperature of about 350° C. and using a pressure of about 65 to 350 kg/linear cm. The resulting laminate is passed around chill roll 15 and the the polyester film is stripped off and the uncoated film wound into a roll 16 and the laminate or face sheet which is thermoformable is wound into a roll 17.

The resulting face sheet is then thermoformed into a shaped structure as shown in FIG. 3. A section of the face sheet is placed in a vacuum former 18 containing heating lamps 19 and the face sheet is heated to about 100-180° C. The sheet is then vacuum formed into a shaped structure 20 having a painted surface which can be used in an injection molding process to form an auto or truck part. The shaped structure 20 is positioned in a conventional injection molding machine 21 in which a thick layer of a thermoplastic olefin is injection molded to form a backing layer about 500-25,000 microns in thickness. The resulting part 22 is useful for autos and trucks and has a surface that is smooth and glossy, has an excellent distinctness of image and good color uniformity and in general meets all the requirements of an automotive finish.

The glossy clear finish and the paint layer provide the laminate with an exterior decorative finish that is acceptable for automobiles and trucks. The finish must have the following acceptable properties to be useful as an automotive or truck finish: a gloss measured at 20° of at least 60 and measured at 60° of at least 75, a distinctness of image (DOI) of at least 60, gasoline resistance, cleanability, acid spot resistance, hardness of at least 2 Knoops, chip resistance, impact strength of at least 20 inch pounds measured at room temperature and at −29° C., paint adhesion, resistance to water and humidity exposure and outdoor weatherability.

The following is a description of the test methods used to determine the above properties. Certain test methods identified below are publicly available standard industry specifications and test methods which are incorporated herein by this reference.

Gloss is measured by specular reflectance of a beam of light at angles of 20° and 60°. Specular reflectance is measured before the finished painted surface is buffed and waxed. A Byk-Mallinckrodt "multigloss" or "single gloss" gloss meters are used for measuring specular gloss of the finish. These gloss meters give values equivalent to those obtained from ASTM Method D-523-67. The preferred test method is described in GM Test Specification TM-204-A.

Distinctiveness-of-Image (DOI) is a measurement of the clarity of an image reflected by the finish. DOI is measured from the angle of reflection of a light beam from a spherical surface. DOI is measured by the Hunterlab Model No. D47R-6F Doigon Gloss Meter. A test panel is placed on the instrument sensor and the sharpness of the reflected image is measured Details of the DOI test procedure are described in GM Test Specification TM-204-M.

Gasoline Resistance requires no color change, degradation, tackiness, marring or loss of paint adhesion on plastic parts after a finished part is immersed for ten seconds, ten times, in a specified reference fuel with a 20 second dry off period between each immersion. Immediately after the tenth immersion, the painted surface is checked and must pass Thumbnail Hardness according to GM Test Specification TM 55-6.

Cleanability is tested according to GM Test Specification TM 31-11 in which the painted plastic part is subjected to ten rubs with cheesecloth saturated with 9981062 Naphtha or currently used and approved cleaning solvents. There should be no evidence of staining, discoloration, or softening of the painted surface and no evidence of color transfer from the test part to the cloth. One rub consists of one forward and backward motion.

The Acid Spotting Resistance Test requires the painted part to withstand exposure to 0.1 N sulfuric acid for 16 hours without any evidence of staining, discoloration, or softening of the paint.

Hardness is measured by a standard Knoop Hardness Test.

Chip resistance is determined by a Gravelometer Test described in SAE J-400. The painted part as received and after 3 and 6 months Florida exposure, described below, is tested at −23° C. and must have a minimum rating of 8 as determined by F. B. Gravelometer Rating Chart.

Impact strength of a painted part is tested at room temperature by the Gardener Test and by the Rosand Test at −29° C.

Paint Adhesion of a painted part is determined by a standard Tape Adhesion Test described in GM Test Specification TM 55-3. According to this test, a tape is pressed down over an X-shaped cut in the paint coat and the tape is then removed to test the amount of peeling. The test requires a minimum of 99% of the paint remaining in the tape test area.

Resistance to Water and Humidity Exposure is measured by several tests. In one test, the finished part is exposed to 96 hours of humidity exposure at 100% relative humidity and 38° C. in a humidity cabinet defined in GM test specification TM 55-3, and a two-hour water immersion test at 38° C. according to GM test specification TM 55-12. The resulting paint panel should show no evidence of blistering when examined one minute after removal from the test cabinet and shall withstand the Paint Adhesion Test described above. The Paint Adhesion Test is performed within one minute after removal from either test cabinet. In a second test, the painted panel should withstand 15 cycles of the Moisture-Cold Cycle Test defined in GM test specification TM 45-61A, without any visible signs of cracking or blistering. After 15 cycles, the paint panel is exposed to 96 hours of the humidity exposure described above, followed by the Paint Adhesion Test also described above. The panel is expected to pass both tests. The Paint Adhesion Test is performed within one minute after removal from the humidity environment. One cycle consists of 24 hours and 100% relative humidity at 38° C., 20 hours at −23°C., and four hours at room temperature.

For outdoor weatherability, painted panels are exposed for 3 years in Florida facing south in a black box positioned 5° from the horizontal. The painted panels should retain 40% of their original gloss and there should be no blistering or fading of the paint.

The finish must be sufficiently flexible at thermoforming temperatures and must have sufficient durability to withstand thermoforming and injection molding process without embritteling, cracking or otherwise degrading the finish. The finish must be thermoplastic and flexible and must retain its gloss and other appearance properties after processing.

The glossy clear finish is formed from a clear coating composition. The composition contains about 15–80% by weight film forming binder and correspondingly about 85–20% by weight of a liquid carrier. The composition may have a solvent carrier or an aqueous carrier and the binder of the composition may be in solution or in dispersion form. The binder basically is thermoplastic to withstand the thermoforming and injection molding process for making a part. The clear coat must be able to withstand an elongation of about 40–150% at a film thickness of about 10–50 microns and thermoforming temperatures of about 100–150° C.

Typically, an acrylic resin such as polymethyl methacrylate and copolymers thereof can be used as the binder for the clear coating composition. Dispersions of polymethyl methacrylate copolymers such as "Lucite" Dispersion Lacquers (LDL) can be used. Typically useful LDL coating are described in U.S. Pat. No. 3,660,537 issued May 2, 1972 to Fryd et al which is hereby incorporated by reference.

The methacrylate compositions and the LDL compositions contain from about 5–30% by weight, based on the weight of the film forming binder, of a plasticizer. Typically useful plasticizers are for example, phthalate esters such as butylbenzyl phthalate, dibutyl phthalate, 2-ethyl hexylbenzyl phthalate, dicyclohexyl phthalate, dibenzyl phthalate, butylcyclohexyl phthalate, di-2-ethylhexyl ester of hexamethylene diphthalate, di-(methylcyclohexyl)phthalate. One preferred plasticizer of this group is butylbenzyl phthalate. Other plasticizers that can be used are mixed benzoic acid and fatty oil acid esters of pentaerythritol, poly(propylene adipate) dibenzoate, diethylene glycol dibenzoate, ethylene glycol adipate benzoate and neopentyl glycol adipate benzoate. Other plasticizers are tetrabutylthiodisuccinate, butylphthalyl butyl glycolate, acetyltributyl citrate, dibenzyl sebacate, tricresyl phosphate, toluene ethylsulfonamide.

Thermoplastic fluorinated polymers such as polyvinylidene fluoride (PVDF) and copolymers and terpolymers thereof also can be used for the clear coating composition. A blend of an acrylic resin and a fluorinated polymer is used.

The blend contains about 50–80% by weight of PVDF and correspondingly 20–50% by weight of a poylmethacrylate. Generally, a high molecular weight (MW) PVDF resin is used having a weight average MW weight of about 200,000–600,000 and a relatively high MW polymethyl methacrylate or polyethyl methacrylate having a weight average MW of about 50,000–400,000.

To improve weatherability of the clear coat about 0.1–5%, by weight, based on the weight of the binder, of an ultraviolet light stabilizer or a combination of ultraviolet light stabilizers can be added to the clear coating composition. Typically useful ultra-violet light stabilizers are as follows:

Benzophenones such as hydroxy dodecyloxy benzophenone, 2,4-dihydroxybenzophenone, hydroxybenzophenones containing sulfonic groups and the like.

Triazoles such as 2-phenyl-4-(2',2'-dihydryoxylbenzoyl)-triazoles, substituted benzotriazoles such as hydroxy-phenyltriazoles and the like.

Triazines such as 3,5-dialkyl-4-hydroxyphenyl derivatives of triazine, sulfur containing derivatives of dialyl-4-hydroxy phenyl triazines, hydroxy phenyl-1,3,5-triazine and the like.

Bezoates such as dibenzoate of diphenylol propane, tertiary butyl benzoate of diphenylol propane and the like.

Other ultraviolet light stabilizers that can be used include lower alkyl thiomethylene containing phenols, substituted benzenes such as 1,3-bis-(2'-hydroxybenzoyl)benzene, metal derivatives of 3,5-di-t-butyl-4-hydroxy phenyl propionic acid, asymmetrical oxalic acid, diarylamides, alkylhydroxy-phenyl-thioalkanoic acid ester and the like.

Particularly useful ultraviolet light stabilizers that can be used are hindered amines of bipiperidyl derivatives such as those in Murayama, et al., U.S. Pat. No. 4,061,616, issued Dec. 6, 1977.

The clear coat can also contain transparent pigments, i.e., pigments having the same or similar refractive index as the binder of the clear coat and are of a small particle size of about 0.015-50 microns. Typical pigments that can be used in the clear coat in a pigment to binder weight ratio of about 1/1000 to 10/1000 are inorganic siliceous pigments, such as silica pigments. These pigments have a refractive index of about 1.4-1.6.

The color coating composition used herein has as the binder any of the aforementioned binders used in the clear coating composition and also can use the same plasticizers and it may be advantageous to use ultraviolet stabilizers in composition. The composition does contain pigments in a pigment to binder weight ratio of about 1/100 to 100/100.

Any of the conventional pigments used in coating compositions can be utilized such as the following: metallic oxides, such as titanium dioxide, zinc oxide, iron oxide and the like, metal hydroxide, metal flakes such as aluminum flake, chromates, such as lead chromate, sulfides, sulfates, carbonates, carbon black, silica, talc, china clay, phthalocyanine blues and greens, organo reds, organo maroons and other organic pigments and dyes.

The pigments are formulated into a mill base by mixing the pigments with a dispersing resin which may be the same as the binder of the composition or may be another compatible dispersing resin or agent. The pigment dispersion is formed by conventional means such a sand grinding, ball milling, attritor grinding, two roll milling. The mill base is then blended with the binder of the composition to form the coating composition.

The chlorinated polyolefin size layer of the face sheet is formed from a coating composition of a solution of the chlorinated polyolefin. The coating composition contains about 10-60% by weight of the chlorinated polyolefin and correspondingly about 40-90% by weight of solvent. Any of the conventional solvents can be used that will dissolve the chlorinated polyolefin such as toluene, xylene, n-methyl pyrrolidone and mixtures. The chlorinated polyolefin preferably is a chlorinated polypropylene or chlorinated polyethylene containing up to 50% by weight chlorine and preferably 15-50% by weight chlorine. One preferred chlorinated polypropylene is a propylene/maleic anhydride copolymer chlorinated to a level of about 15-50% by weight chlorine. One particularly preferred chlorinated polypropylene of polypropylene and maleic acid contains about 18-35% by weight chlorine and has an acid no. of about 15.

The flexible sheet and the rigid layer of the composite are prepared from standard automotive grade TPO resins. These resins typically are compounded from polypropylene resin, synthetic rubbers, additives, antioxidants and pigments. Typical polypropylene resins used have a melt flow between 0.5-35 g/10 min. The following are typical rubbers that are compounded with the polypropylene resins: ethylene/propylene rubbers or ethylene/propylene/maleate rubbers. The compounded TPO resin usually contains pigments such as carbon black, calcium carbonate, silica, talc and other filler or reinforcing pigments. Colored pigments described above can also be used. The specific formula for the compounded TPO rein varies according to each supplier but each composition must meet the structural specifications such as flexural modulus, tensile strength, elongation, tear strength and hardness and process constraints such as melt flow and mold shrinkage. The flexural modulus of a typically useful TPO resin is about 175-2100 mega pascals (MPa).

The flexible sheet of the composite is of a thermoplastic polyolefin of a standard automotive quality TPO resin. The TPO resin can be extruded to form a 250-1250 micron thick sheet using conventional sheet extrusion techniques and equipment. TPO resins with melt flow indexes of about 0.5-8.0 g/10 min. can be used but resins with melt flow indexes of about 0.5-2.0 g/10 min. are preferred.

The extrusion conditions used to form the flexible sheet are such that a sheet with a smooth "Class A" surface is formed and the sheet has low internal stresses. Stresses in the flexible sheet are measured by cutting a 4×4" section of the sheet and laying the section on a flat surface. The edges and the corners of the section should lie flat for an unstressed film.

The injection molding resin used to form the rigid layer of the composite is a TPO resin having a melt flow of about 0.5-8.0 g/10 min. Preferably, the resin has a melt flow of about 4.0-8.0 g/10 min.

The TPO composite of this invention provides automotive manufacturers with many advantages over prior art compositions. Adhesion problems with recessed portions of a part are minimized, solvent emissions associated with spray painting, the need for expensive hangers and jigs to maintain shape of a plastic part during baking and the need for a primer which is required in a conventional paint spraying process all are eliminated. Additionally, the composite has a unique set of characteristics that make it superior to conventional injection molded and spray painted parts.

The color coat/clear coat of the composite of this invention can be cured at temperatures in excess of 200° C. versus a maximum of 125° C. for conventional injection molded and spray painted plastic parts. This allows for the use of paint chemistries which can not be used with conventional TPO parts. For example, fluorocarbon polymers can be used which are substantially more durable and chemical resistant than conventional low bake paints.

Also, the TPO flexible sheet of the composite need not be of the same composition as the rigid layer. A soft low flexural modulus flexible sheet can be used over a rigid layer having a high flexural modulus giving a part with rigidity but with a "soft feeling" of the low flexural modulus TPO. A composite such as the above, would result in a part that deflects stones without damage. Alternately, a high flexural modulus flexible sheet can be used over a soft low modulus rigid layer of TPO resin. The more rigid flexible sheet would reinforce the soft low modulus rigid layer without substantially changing the overall properties of the resulting composite.

The TPO used for the flexible sheet can be of a different quality than the TPO used for the rigid layer of the composite. Presently, in the formation of injection molded automotive parts from TPO resins, the TPO resin must be of the highest quality, i.e., free of gel particles and any foreign matter, to ensure that a defect free part is formed with a "Class A" surface. The surface of the composite of this invention is determined by the surface of the flexible sheet, only the flexible sheet need be of a high quality TPO resin while the rigid layer of the composite can be of a lower quality TPO resin, for example, that may contain gel particles and not affect the appearance of the resulting part or the structural integrity of the part.

The ability to separate the surface characteristic of the composite from the injection molded resin used to form the rigid layer of the composite allows for the formation of greatly improved auto parts. For example, fiberglass reinforced or other filler reinforced TPOs can be used for the injection molding resin for the rigid layer of the composite and stronger and more rigid parts can be formed than has been possible before.

The following Examples illustrate the invention. All parts and percentages are on a weight basis unless otherwise indicated and molecular weights are determined by gel permeation chromatography using polymethyl methacrylate as a standard.

EXAMPLE 1

A thermoformed thermoplastic polyolefin (TPO) quarter panel for a Pontiac Fiero having an exterior high gloss jet black automotive paint was formed. A cross section of the the quarter panel is similar to that shown in FIG. 1. The paint coat was first coated onto a surface of a sheet of flexible polyester film. The film is a 50 micron thick high gloss Du Pont "Mylar" 200A polyethylene terephthalate polyester film. The paint layers coated onto the film are a clear coat, a color coat and a chlorinated polyolefin size coat. Each was coated onto the polyester film in that order.

A clear coating composition was prepared as follows:

| Ingredient | Parts by Weight |
| --- | --- |
| Methylethyl ketone | 40.85 |
| Butyrolactone | 40.85 |
| "Elvacite" 2021 - (Polymethyl methacrylate having a weight average Mw of 200,000) | 6.22 |
| UV absorber ["Tinuvin" 900-2-hydroxy-3,5-di[1,1-dimethyl(benzyl)phenyl]-2H—benzotriazole] | 0.35 |
| Hindered amine light stabilizer-["Tinuvin" 292-bis(1,2,2,6,6-pentamethyl-4 piperidinyl)sebacate] | 0.18 |
| "Kynar" 301 F(PVDF polyvinylidene fluoride) | 11.15 |
| Total | 100.00 |

The solid ingredients were added to the methyl ethyl ketone and butyrolactone solvents with mixing and mixing was continued until dissolved. The film forming binder of the coating contains about 65% PVDF and 35% polymethyl methacrylate by weight, based on the total of PVDF and methacrylate. The clear coating was applied by reverse roll coater to the polyester film (illustrated in FIG. 2). The clear coat was dried on the polyester sheet by passing it through a multi-zone impinging air drying oven having three heating zones spaced apart axially along the length of the carrier, with each drying zone having a progressively higher temperature. The clear-coated polyester sheet was passed through the heating zones at a line speed of about 7.5 meters per minute; each heating zone was about 12 meters long. Temperatures of the three heating zones were: Zone 1: 125° C., Zone 2: 165° C., Zone 4: 200° C. By passing the clear coated polyester sheet through the three heating zones, substantially all solvent gases from the clear coat were removed to produce a dry clear coat of uniform film thickness about 20 microns thick.

A jet black color coating composition was formulated as follows:

| Ingredient | Parts |
| --- | --- |
| Cyclohexanone | 9.27 |
| Diisobutyl ketone | 18.54 |
| Butyrolactone | 8.34 |
| "Elvacite" 2042 -(polyethyl methacrylate having a weight average Mw 300,000) | 10.02 |
| "Solsperse" 17,000 Dispersing agent | 0.10 |
| "Kynar" 301F (described above) | 24.04 |
| Butyrolactone | 14.14 |
| Black Pigment Dispersion | 15.00 |
| Total | 99.45 |

The black pigment dispersion comprised carbon black in a vehicle of "Elvacite" 2043, (polyethyl methacrylate) available commercially as Gibralter 438-39110 pigment.

The color coating composition was prepared by first dissolving the acrylic resin in the cyclohexanone, diisobutyl ketone and butyrolactone solvents at a temperature of about 55° C. and then allowing it to cool before the polyvinyl fluoride component was added to the mixture to form a dispersion of the polyvinylidene fluoride in the acrylic resin. The black pigment dispersion was then added to the resulting mixture to produce the jet black color coating composition. On a weight basis, the amount of pigment contained in the color coating was about 4-5%. The binder of the coating contained about 65% polyvinylidene fluoride and 35% acrylic resin by weight. The acrylic resin component comprised about 90% "Elvacite" 2042 and 10% "Elvacite" 2043. The color coating composition was coated onto the dried clear coat as above and then passed through the three stage oven described above to dry the color coating and form a dry color coating layer about 20 microns thick.

A CPO (chlorinated polyolefin) size coating composition for use with a TPO backing sheet was formulated as follows:

| Ingredient | Parts |
| --- | --- |
| Xylene | 24.60 |
| Chlorinated polyolefin (CPO) solution (Eastman's CP-343-1 25% solids in xylene of chlorinated polypropylene/maleic acid polymer, acid no. about 15, chlorine content about 18-23%) | 25.00 |
| Toluene | 42.50 |
| N—methyl pyrrolidone | 1.00 |
| Acrylic Dispersion Resin (60% solids of an acrylic vinyl oxazoline ester polymer described in Example 1 of Miller U.S. Pat. No. 3,844,993) | 6.90 |
| Total | 100.00 |

The binder of the size coating composition contained about 60% CPO (chlorinated polyolefin) and 40% acrylic resin by weight. The size coat composition was coated onto the dried color coat to a dry film thickness of about 2.5 microns using the reverse roll coater. The three temperature zones were maintained at the same temperature as used for the clear and color coats but a carrier speed 30 meters per minute was used.

The resulting paint coated polyester film was then passed to a laminating operation illustrated in FIG. 2, where the paint coat of the polyester film was transferred to a 500 micron thick TPO (thermoplastic polyolefin) backing sheet made from RPI E-1000, thermoplastic olefinic elastomer to form a face sheet. RPI E-1000 has a flexural modulus of approximately 690 MPa and a melt flow rate of approximately 0.8 g/10 min. In the laminating operation, the backing sheet and the paint coated polyester film carrier were run at a lineal speed of 5 meters per minute, and the laminating drum was operated at a temperature of 177° C. The CPO size coat was heat activated and the paint coat was transferred from the polyester film to the face of the TPO backing sheet during the laminating operation, in which the hot steel drum applied a force of about 54 Kg/lineal cm to form a the face sheet. The polyester film was stripped away from the surface of the face sheet, leaving the paint coat bonded to the TPO sheet, with the clear coat providing a high gloss surface on the exterior of the TPO backing sheet.

The resulting face sheet was then thermoformed into a complex three-dimension shape to form the plastic quarter panel molding (illustrated in FIG. 3). In the thermoforming process, the face sheet was first heated to a temperature of about 121° C. to soften the face sheet. The heated face sheet then was placed over a pressure assist vacuum former buck and a vacuum was drawn against the buck on the TPO side of the face sheet and 2.1 kg/cm² gauge of air pressure applied on the clear coat side of the laminate to form the heated face sheet into the three dimensional shape of the quarter panel.

The resulting thermoformed laminate was then trimmed to fit in the mold cavity of a plastic injection molding machine (see FIG. 3). A quarter panel was then formed. An elastomeric thermoplastic alloy molding resin RTA-3263 from Republic Plastics Company, having a flexural modulus of about 1725 Mpa was used for forming the base of the quarter panel. The resin was injected into the mold behind the thermoformed laminate fusing the resin to the TPO base of the laminate to form the quarter panel about 2.5-3.75 mm thick. The mold was operated at the normal melt temperature for the resin. A quarter panel was formed that is in an integral plastic composite part with a defect-free paint coat on the exterior surface of the panel.

The quarter panel was tested and the tests demonstrated the usefulness of the paint coat as an exterior automotive finish. The test results indicated that desirable appearance properties, including gloss, were produced. Specular reflectance measured 70 at 20° and DOI (Distinctness of Image) measured 85. Color uniformity was good. The test results also demonstrated a desirable combination of durability properties. The test panel passed tests for gasoline resistance, acid resistance, chip resistance (gravelometer reading of 9), impact resistance (80 in-lb. for Gardner Test) and passed QUV and 96 hour humidity exposure tests.

EXAMPLE 2

The paint coated face sheet prepared in Example 1 was thermoformed and trimmed and placed into the mold cavity of a plastic injection molding machine. ETA 3041C elastomeric thermoplastic alloy molding resin, from Republic Plastics Company, having a flexural modulus of about 280 MPa was used for forming the substrate base of the quarter panel. The resin was injected into the mold behind the thermoformed face sheet fusing the TPO of the face sheet to the resin. The mold was operated at a normal melt temperature for the ETA 3041C resin. A quarter panel was formed that is an integral plastic composite part with a defect-free paint coat on the exterior surface of the panel.

The quarter panel is not suitable for use as a vertical body part on an automobile because of its flexibility but it does show that this process is capable of producing viable facia and bumper components. The quarter panel was tested and had a specular reflectance of 70 at 20° and DOI of 85. Color uniformity was good. The test results also demonstrated a desirable combination of durability properties. The test panel passed tests for gasoline resistance, acid resistance, chip resistance, impact resistance and passed QUV and 96 hour humidity exposure tests.

EXAMPLE 3

The paint coated polyester film described in Example 1, having a CPO layer and black color coat/clear coat layers was laminated using the process of Example 1 to a 500 micron thick backing sheet of RPI D-760 Resin, which is a 1104 MPa flexural modulus thermoplastic olefinic elastomer molding resin. The resulting face sheet was thermoformed and fitted into the quarter panel mold of a plastic injection molding machine as described in Example 1. A quarter panel was formed by injection of RPI D-760 resin into the mold behind the thermoformed face sheet fusing the resin to the TPO base of the face sheet. The mold was operated at the normal melt temperature for the RPI D-760 resin. A quarter panel was formed that is an integral plastic composite part with a defect-free paint coat on the exterior surface of the panel.

The quarter panel was tested as in Example 1 and passed each test.

EXAMPLE 4

The paint coated polyester film described in Example 1, having a CPO layer, black color coat/clear coat layers was laminated using the process of Example 1 to a 500 micron thick backing sheet of RPI E 1500 Resin thermoplastic olefinic elastomer extruding resin which has a 1050 MPa flexural modulus. The resulting face sheet was thermoformed and fitted into he quarter panel mold of a plastic injection molding machine. A quarter panel was formed by injection of RPI D-760 resin into the mold behind the thermoformed face sheet fusing the TPO of the face sheet to the resin. The mold was operated at the melt temperature of the resin. A quarter panel was formed that is an integral plastic composite part with a defect-free paint coat on the exterior surface of the panel.

The quarter panel was tested as in Example 1 and passed each test.

EXAMPLE 5

A quarter panel was formed as in Example 1, except the following black color coat/clear coat acrylic dispersion coating was substituted for the polyvinylidene fluoride/acrylic thermoplastic black color coat/clear coat of Example 1. The clear coat was prepared as follows:

| Ingredient | Parts |
| --- | --- |
| Aromatic controlled Mineral Spirits (Varsol 18) | 6.94 |
| Diethylene glycol monobutyl ether | 5.00 |
| Diethylphthalate | 2.37 |
| Acrylic Dispersion Resin (40% solids of an acrylic polymer described in Example 1 of U.S. Pat. No. 3,660,537) | 74.05 |
| Coconut oil alkyd (85% solids coconut oil/ ethylene glycol/phthalic anhydride) | 3.37 |
| Butyl benzyl phthalate | 3.37 |
| UV absorber ("Tinuvin" 900-described in (Example 1) | 0.75 |
| Hindered Amine light stabilizer (Tinuvin 292- described in Example 1) | 0.75 |
| Silicon Solution | 0.20 |
| Total | 100.17 |

The clear coating applied to the polyester film as in Example 1 to form a dry film having a thickness of about 30 microns. The clear coating was applied using the same procedure as in Example 1, except that the temperature of the ovens were: Zone 1: 38° C., Zone 2: 93° C., Zone 3: 150° C.

A color coating was formulated as follows:

| Ingredient | Parts |
| --- | --- |
| Acrylic dispersion resin (described above) | 62.62 |
| Polyester plasticizer (described above) | 2.54 |
| Coconut oil alkyd (described above) | 2.54 |
| Butyl benzyl phthalate | 1.14 |
| UV absorber | 0.32 |
| Hindered amine light stabilizer (described above) | 0.32 |
| Silicone solution | 0.03 |
| Black Pigment dispersion | 30.49 |
| Total | 100.00 |

The black dispersion comprised carbon black pigment in a vehicle of acrylic dispersion resin and butyl benzyl phthalate.

The color coating was coated onto the dried clear coat of the polyester film as in Example 1 and then passed through the three-stage oven described above to dry the color coat. The resulting color coat was about 30 microns in thickness.

The same CPO size coating composition used in Example 1 was applied to the color coat of the polyester film and baked as described in Example 1. The resulting paint coated polyester film was laminated to a 500 micron thick sheet of TPO of RPI E1000 described in Example 1 using the process of Example 1 to form a face sheet. This face sheet was thermoformed, trimmed and fit into the mold cavity of a plastic injection molding machine. A quarter panel was formed as in Example 1 by using Republic Plastic Company RTA 3263 molding resin as described in Example 1. The quarter panel that was formed is an integral plastic composite part with a defect-free paint coat on the exterior surface of the panel.

The quarter panel was tested as in Example 1. The test results showed that the finish of the panel had desirable appearance properties, including excellent gloss. Specular reflectance was 85 at 20° and DOI was 85. Color uniformity was good. The test results also demonstrated a desirable combination of durability properties for the panel finish. The test panel passed gasoline resistance, acid resistance, chip resistance, impact resistance and QUV and 96 hour humidity exposure tests.

EXAMPLE 6

A high gloss red exterior automotive paint coat was prepared that matched General Motors Fiero red body color to be used in a series of tests to establish that the CPO size coating used in Example 1 was effective over a wide range of TPO backing sheet composition to form a face sheet that is thermoformable and useful in an injection molding process to form a part such as a quarter panel. A clear coat, color coat, and CPO size coat were coated onto the polyester film in that order as in Example 1. The clear coat was prepared as follows:

| Ingredient | Parts |
| --- | --- |
| Cyclohexanone | 15.47 |
| Butyrolactone | 7.52 |
| Diisobutyl ketone | 21.66 |
| "Elvacite" 2042-(Polyethyl methacrylate having a weight average molecular weight of 300,000) | 12.95 |
| UV absorbers (described in Example 1) | 1.11 |
| "Kynar" 301F-PVDF resin described in Example 1) | 24.05 |
| Butyrolactone | 17.24 |
| Total | 100.00 |

The methacrylate resin was dissolved in the butyrolactone, diisobutyl ketone and cyclohexanone solvents, while mixing and heated to about 54° C. The resulting mixture was allowed to cool overnight. The UV absorbers were then added to the mixture and the PVDF was dispersed in the resin. The remaining butyrolactone solvent was added to dilute the final mixture. The PVDF component remained as a dispersion in the mixture rather than dissolving. The binder of the coating contained about 65% PVDF and 35% methacrylate resin, based on the total PVDF and methacrylate solids.

The clear coat was coated on the polyester film and passed through the same three-zone drying oven described in Example 1. Line speed and temperatures of the three zones were the same as Example 1. Substantially all solvent gases from the clear coat were removed and a dry clear coat of uniform film thickness was formed.

The red color coating was formulated as follows:

| Ingredient | Parts |
| --- | --- |
| Cyclohexanone | 10.61 |
| "Elvacite" 2042-(Polyethyl methacrylate (described above) | 2.99 |
| "Solsperse" 17,000 dispersing agent | 0.10 |
| "Kynar" 301F - PVDF resin | 19.95 |
| Butyrolactone | 4.02 |
| N—methyl pyrrolidone | 8.45 |
| Red Dispersion | 57.90 |
| Total | 104.02 |

The red dispersion has a 16% solids content of several red pigments and a vehicle of "Elvacite" 2043, polyethyl methacrylate resin, and 84% cyclohexanone solvent. The color coating was prepared in a similar manner to the clear coating. The methacrylate resin was first dissolved in the solvents at a temperature of about 54° C. The dispersing agent and a portion of the red dispersion were added. The mixture was allowed to cool to room temperature and the PVDF component was dispersed using a high speed mixer. The remainder of the red dispersion was then added to the resulting mixture to produce a red color coating composition. The binder of the color coating contains about 65% PVDF and 35% methacrylate resin, based on the weight of the total PVDF and methacrylate solids. The methacrylate resin comprises about 80% "Elvacite" 2043 and 20% "Elvacite" 2042. The pigment was present in a ratio of three parts pigment to ten parts binder, or about 23% of the total solids. As in Example 1, the color coating was coated onto the dried clear coat of the polyester film and then passed through the three staged oven described above to form a dried color coat about 20 microns thick.

The color coat of the red color coat/clear coat/ polyester sheet was then coated with the CPO size coating of Example 1 using a laboratory coater. The CPO size coating was based for 5 minutes at 150° C. to remove the volatile solvents and dry film about 5 microns in thickness was formed.

In separate operations, using a laboratory laminator with a hot roll at 177° C. and with 10.7 kg per per linear cm pressure, a portion of the above polyester sheet with CPO size coat was transferred to each of the following TPO backing sheets: 800 micron thick sheets of Republic Plastics Company ETA 3041C Resin (Flexural modulus of about 276 MPa) and RTA 3263 Resin (Flexural modulus of about 1725 MPa), and 500 micron thick sheets of RPI E 1000 Resin (Flexural modulus of about 690 MPa), Republic Plastics Company ETA Resin (Flexural Modulus of 945 MPa), RPI D760 Resin (Flexural Modulus of 1120 MPa) and RPI E1500 Resin (Flexural Modulus of 1050 MPa).

Each of the resulting face sheets was thermoformed in a laboratory vacuum thermoformer for use in a 10×25×0.3 cm panel plaque mold. The face sheet was heated to 135° C. before forming. Each of the thermoformed face sheets were trimmed and placed into the injection molding machine as in Example 1. ETA 3041C resin (described in Example 2) was used for forming the substrate base of the test plaques and was injected into the mold behind the thermoformed face sheet fusing the TPO of the face sheet to the resin. The mold was operated at the normal melt temperature for the ETA 3041C resin. Each of the test plaques formed was an integral composite part with a defect-free paint coat on the exterior surface of the plaque.

The above TPO resins used to form the laminates are typical automotive quality resins that are believed to be essentially polypropylene resins modified with elastomeric polymers, pigments and additives. The test plaques formed were extensively tested for all automotive properties particularly for adhesion between the color coat/clear coat paint and the TPO backing sheet. In all cases adhesion was excellent. Adhesion between the TPO backing sheet and the ETA 3041C substrate resin was also excellent.

This experiment was repeated using RPI D760 as the substrate resin described in Example 3. Adhesion between the TPO backing sheets and the RPI D760 substrate resin was excellent.

Other size coatings normally used in laminating processes with vinyl, nylon or ABS resins were tested on the above TPO backing sheets using the above process. The following size coatings were used: a water borne polyurethane size (Polyvinyl Chemical Co. Neorez R03141 NCO acryl A 5144) a vinyl size (Union Carbide VYHH) and an acrylic size (Acryloid A-101—a trademark of Rohm and Haas Company). In one case, the size coating was omitted. In all cases, no adhesion between the color coat/clear coat paint and the TPO backing sheet was obtained indicating the necessity of using a CPO containing size coating.

EXAMPLE 7

A series of size coatings based on Eastman Chemical Corporations commercial chlorinated polyolefins were coated over the "Mylar" polyester/clear coat/color coat sheet produced in Example 6. The products tested were CP-153-2 containing 21.5-25% chlorine, CP-343-1 containing 18-23.3% chlorine, CP-343-3 containing 26.5-31.5% chlorine—all believed to be chlorinated polypropylene/maleic acid and CP-515-2 containing 26.5-31.5% chlorine believed to be chlorinated polyethylene. Each of the CPO size solutions was diluted with xylene and each was individually applied as a size coating to a "Mylar" coated sheet described above.

The laboratory laminator of Example 6 was used to form the face sheets of the various TPO backing sheets described in Example 6 using the red color coal/clear coat of Example 6. Each of the resulting face sheets were thermoformed and made into 10×25×0.3 cm test panels. Each of the test panels produced was tested for adhesion and chip resistance. The adhesion between the TPO backing sheet and the color coat/clear paint was excellent showing that each of the above CPO compounds can be used as a size coating.

I claim:
1. A three dimensional thermoplastic polyolefin composite useful as an exterior auto or truck body part consisting essentially of the following components:
   1. a multilayer coating consisting essentially of
      a. a 10-125 micron thick layer of a glossy clear thermoplastic finish formed from a clear coating composition bonded firmly to
      b. a 5-75 micron thick layer of a thermoplastic pigment containing paint firmly bonded to
      c. a 1-25 micron thick size layer of a thermoplastic chlorinated polyolefin containing 15-50% by weight chlorine;
   said multilayer coating formed by applying a layer of a clear coating composition to a polymeric film, applying a paint layer to the layer of clear coating composition and then applying a layer of the thermoplastic chlorinated polyolefin to the paint layer and curing the multilayer coating; said multilayer being firmly bonded by lamination to
   2. a 250-1250 micron thick layer of a flexible extruded sheet of a thermoplastic polyolefin having a flexural modulus of about 175-2100 MPa and a melt flow rate of about 0.5-2.0 g/10 min.; wherein the chlorinated polyolefin layer of the multilayer coating is in contact with the sheet of thermoplastic polyolefin and the polymeric sheet is removed after lamination to leave a smooth glossy surface on the clear layer and the resulting flexible sheet having the multilayer coating is thermoformed into a three dimensional structure that is bonded to
   3. a 500-25,000 micron thick rigid layer of a thermoplastic polyolefin resin having a modulus of about 175-2100 MPa and a melt flow rate of about 4.0-8.0 g/10 min. formed by injection molding said resin to the flexible sheet having a three dimensional structure;

wherein layers a. and b. of the multilayer form the exterior surface of the composite and have a gloss of at least 60 measured at 20° and a distinctness of image of at least 60.

2. The composite of claim 1 in which the chlorinated polyolefin consists essentially of a propylene/maleic acid copolymer containing about 15–50% by weight chlorine.

3. The composite of claim 1 in which the chlorinated polyolefin consists essentially of a chlorinated polyethylene containing about 15–50% by weight chlorine.

4. The composite of claim 1 in which the size layer consists essentially of a chlorinated polypropylene and maleic anhydride polymer containing about 18–35% by weight chlorine.

5. The composite of claim 1 in which the size layer of the chlorinated polyolefin comprises a mixture of the chlorinated polyolefin and a thermoplastic polymer selected from the group consisting of ethylene vinyl acetate polymer, alkyd resin, and acrylic polymers.

6. The composite of claim 1 in which the clear layer comprises a layer of a polymer selected from the group consisting of methyl methacrylate polymer and copolymers thereof.

7. The composite of claim 1 in which the clear layer comprises polymethyl methacrylate and a graft copolymer having a backbone of polymerized monomers of esters of acrylic acid or methacrylic acid and allyl methacrylate or allyl acrylate grafting sites having grafted thereto polymeric segments of alkyl acrylate or alkyl methacrylate units.

8. The composite of claim 7 in which the pigment containing layer comprises polymethyl methacrylate and a graft copolymer having a backbone of polymerized monomers of ester of acrylic acid or methacrylic acid and allyl methacrylate or allyl acrylate grafting sites having grafted thereto polymeric segments of alkyl acrylate or alkyl methacrylate units and contains pigment in a pigment to binder weight ratio of about 1/100–100/100.

9. The composite of claim 1 in which the pigment containing layer comprises a layer of a polymer selected from the group consisting of methyl methacrylate polymer and copolymers thereof and contains pigment in a pigment to binder weight ratio of about 1/100–100/100.

10. The composite of claim 1 in which the clear composite a mixture of about 50–80% by weight of polyvinylidene fluoride and correspondingly 50–20% by weight of polymethyl methacrylate or polyethyl methacrylate.

11. The composite of claim 10 in which the pigment containing paint layer comprises a mixture of about 50–80% by weight of polyvinylidine fluoride and correspondingly 50–20% by weight of polymethyl methacrylate or polyethyl methacrylate and pigment in a pigment to binder weight ratio of about 1/100–100/100.

12. The composite of claim 1 in which the flexible sheet of thermoplastic polyolefin comprises an extruded sheet of a compounded mixture of polypropylene, a synthetic elastomeric resin, pigments and additives.

13. The composite of claim 1 in which the rigid layer of thermoplastic polyolefin comprises a compounded mixture of polypropylene, a synthetic elastomeric resin, pigments and additives.

14. A thermoformable sheet structure useful for forming the composite of claim 1 consisting essentially of the following components:

1. a multilayer coating consisting essentially of
   a. a 10–125 micron layer thick layer of a glossy clear thermoplastic finish formed from a clear coating composition bonded firmly to
   b. a 5–75 micron thick layer of a thermoplastic pigment containing paint firmly bonded to
   c. a 1–25 micron thick layer of a thermoplastic chlorinated polyolefin containing 15–50% by weight chlorine;

said multilayer coating formed by applying a layer of a clear coating composition to a polymeric film, applying a paint layer to the layer of clear coating composition and then applying a layer of the thermoplastic chlorinated polyolefin to the paint layer and curing the multilayer coating; said multilayer coating being firmly bonded by lamination to 2. a 250–1250 thick layer of flexible extruded sheet of a thermoplastic polyolefin having a flexural modulus of about 175–2100 MPa and a melt flow rate of about 0.5–2.0 g/10 min.; wherein the chlorinated polyolefin layer of the multilayer coating is in contact with the sheet of thermoplastic polyolefin sheet.

15. The thermoformable sheet structure of claim 14 in which the chlorinated polyolefin consists essentially of a propylene/maleic acid copolymer.

16. The thermoformable sheet structure of claim 14 in which the chlorinated polyolefin consists essentially of chlorinated polyethylene.

17. The thermoformable sheet structure of claim 14 in which the size layer consists essentially of a chlorinated polypropylene and maleic anhydride polymer containing about 18–35% by weight chlorine.

18. The thermoformable sheet structure of claim 14 in which the size layer of the chlorinated polyolefin comprises a mixture containing a thermoplastic polymer selected from the group consisting of ethylene vinyl acetate polymer, alkyd resin, and acrylic polymers.

19. The thermoformable sheet structure of claim 14 in which the clear layer comprises a layer of a polymer selected from the group consisting of methyl methacrylate polymer and copolymers thereof.

20. The thermoformable sheet structure of claim 14 in which the clear layer comprises polymethyl methacrylate and a graft copolymer having a backbone of polymerized monomers of ester of acrylic acid or methacrylic acid and allyl methacrylate of allyl acrylate grafting sites having grafted thereto polymeric segments of alkyl acrylate of alkyl methacrylate units.

21. The thermoformable sheet structure of claim 14 in which the pigment containing layer comprises a layer of a polymer selected from the group consisting of methyl methacrylate polymer and copolymers thereof and contains pigment in a pigment to binder weight ratio or about 1/100–100/100.

22. The thermoformable sheet structure of claim 14 in which the pigment containing layer comprises polymethyl methacrylate and a graft copolymer having a backbone of polymerized monomers of ester of acrylic acid or methacrylic acid and allyl methacrylate or allyl acrylate grafting sites having grafted thereto polymeric segments of alkyl acrylate or alkyl methacrylate units and contains pigment in a pigment to binder weight ratio of about 1/100–100/100.

23. The thermoformable sheet structure of claim 14 in which the clear comprises a mixture of about 50-80% by weight of polyvinylidine fluoride and correspondingly 50-20by weight of polymethyl methacrylate.

24. The thermoformable sheet structure of claim 14 in which the pigment containing paint layer comprises a mixture of about 50-80% by weight of polyvinylidene fluoride and correspondingly 50-20% by weight of polymethyl methacrylate and pigment in a pigment to binder weight ratio of about 1/100-100/100.

25. The thermoformable sheet structure of claim 14 in which the flexible sheet of thermoplastic polyolefin comprises an extruded sheet of a compounded mixture of polypropylene, a synthetic elastomeric resin, pigments and additives.

* * * * *

UNITED STATES PATENT AND TRADEMARK OFFICE
CERTIFICATE OF CORRECTION

PATENT NO.  : 4,902,557

DATED       : February 20, 1990

INVENTOR(S) : Frank Rohrbacher

It is certified that error appears in the above-identified patent and that said Letters Patent is hereby corrected as shown below:

Claim 10, Column 17, lines 50-51, delete "composite" and insert --comprises--.
Claim 14, Column 18, line 5, after "micron" delete "layer".
Claim 14, Column 18, line 20, after "250-1250" insert --micron--.
Claim 23, Column 19, line 4, after "50-20" insert --%--.

Signed and Sealed this

Nineteenth Day of January, 1993

Attest:

DOUGLAS B. COMER

*Attesting Officer*   *Acting Commissioner of Patents and Trademarks*